Patented Feb. 17, 1948

2,436,074

UNITED STATES PATENT OFFICE 2,436,074

PROCESS OF PREPARING CARBOXY-PYRIMIDO PYRAZINES

John H. Mowat and James H. Boothe, Pearl River, N. Y., assignors, by mesne assignments, to American Cyanamid Company, New York, N. Y., a corporation of Maine No Drawing. Application November 29, 1945, Serial No. 631,788

4 Claims. (Cl. 260—250)

1

The present invention relates to a method of preparing pterins. More particularly, it relates to the preparation of 2-amino-4-hydroxy-6-carboxypyrimido[4,5-b]pyrazine and esters thereof.

The method we use in preparing 2-amino-4-hydroxy-6-carboxypyrimido [4,5-b]pyrazine can be illustrated by the following equation in which 2,4,5-triamino-6-hydroxypyrimidine is reacted with an ester of 3-oxo-2-halo propionic acid:

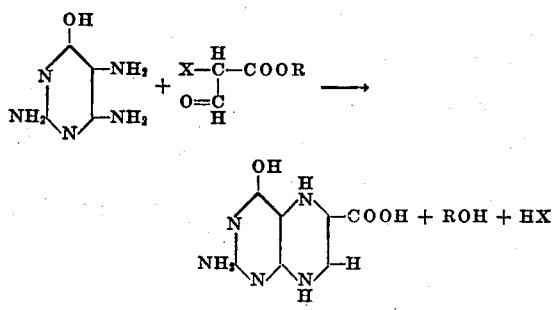

In these formulae R represents an alkyl radical and X a halogen. Esters of these compounds can be prepared by heating the compound in the appropriate alcohol in the presence of a mineral acid.

The first product of the reaction appears to be an unstable dihydro form and, in the presence of oxidizing agents, two hydrogen atoms from the pyrazine nucleus are removed, by oxidation or otherwise, to form the aromatic form of the product. Simple exposure of the product to the air will bring about this change in a short time. Other oxidizing agents, such as elemental iodine, silver salts, peroxides, etc. will produce the same result and it is often an advantage to use such oxidizing agents.

Generally speaking, the compounds produced by the process of the present invention are white to yellow amorphous powders, difficultly soluble in water and organic solvents. The compounds are useful as intermediates in preparing compounds having biological activity.

Of the reactants, 2,4,5-triamino-6-hydroxypyrimidine is a known compound and may be prepared by methods which have been described in the chemical literature. As is also well known, this compound may exist in one or more tautomeric forms, such as:

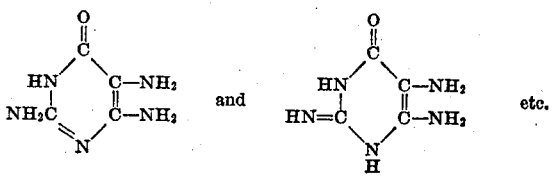

2

Whether or not the compound exists in the keto form or the enol form probably depends upon the pH of the medium in which it is dissolved. In acid media the compound most likely exists in keto form whereas in alkaline media it exists as the enol form. It will also be noted that the 2-amino group may also be tautomeric with an imino group. As will be understood by those in the art, any of the tautomeric forms may be used in the same chemical reactions in like manner and reference hereinafter to the use of one tautomeric form includes the use of the others. Obviously, the final product may exhibit the same kind of tautomerism.

The preferred 3-oxo-2-halopropionic acid ester is ethyl 3-oxo-2-bromopropionate. although as illustrated in the specific examples, other halogenated propionic acid esters may be used in the reaction. It will be noted that acetals of 3-oxo-2-halopropionic acid esters may also be used in the reaction. As an equilibrium exists between the free aldehyde and its acetal in solution, it is believed that the actual reactant is the aldehyde itself. Accordingly, when reference is made to the use of 3-oxo-2-halopropionic acid esters, such reference is intended to include the equivalent use of the corresponding 3-oxo-2-halopropionic acid ester, acetals. Such reference also includes the use of the tautomers of 3-oxo-2-halopropionic acid esters.

The reaction used in carrying out the preparation of compounds of the present invention will take place at from about 20° C. to 120° C. A convenient method and one which we prefer is to heat the reactants at refluxing temperatures until the reaction is complete, usually from about 1 hour to about 10 hours. While the reaction will take place under a wide range of pH conditions, best results appear to be obtained on the acid side.

The reaction is usually conducted with the reactants dissolved or suspended in a solvent such as ethyl alcohol, acetone. water. dilute acid such as dilute hydrochloric acid, or mixtures thereof.

We prefer to isolate the product as a salt by allowing it to crystallize from an alkaline solution, such as, a solution of sodium hydroxide. The free acid can be obtained by treating the salt with any organic acid such as acetic acid or a mineral acid.

The invention will now be described in greater particularity by means of the following specific examples showing the reaction of 2,4,5-triamino-6-hydroxypyrimidine with representative 3-oxo-2-halopropionic acid esters or acetals thereof. It will be understood, of course, that the invention is not limited to the particular details of these examples since other reaction conditions and reactants within the skill of the art may be employed to produce compounds falling within the scope of the present invention.

Example 1

A mixture of 28.4 grams of undistilled ethyl 3,3-diethoxy-2-bromopropionate, 14.8 grams of 2,4,5-triamino-6-hydroxypyrimidine, and 16.6 grams of silver carbonate was refluxed in 444 cc. absolute ethanol under a nitrogen atmosphere for 5 hours. After removal of the alcohol by vacuum distillation and addition of 740 cc. of 4 N hydrochloric acid, the mixture was refluxed another hour. The silver bromide precipitated out and was removed by filtration and the filtrate was vacuum distilled to remove water. After slurrying the residue in 750 cc. hot water, 25 grams of crystalline iodine was added and the mixture was then heated to 90° for 30–40 minutes, during which time partial solution occurred. After adding 5 N sodium hydroxide to pH 6 complete solution was obtained. Adjustment to pH 3–4 with 5 N hydrochloric acid precipitated the crude material, which was filtered and washed with water. The solid was dissolved in 260 cc. of water containing sodium hydroxide sufficient to give a solution having a pH of 11–12. After clarifying with charcoal the concentration of the solution was made 3 N with sodium hydroxide. On standing overnight in a cold room, the disodium salt of the acid crystallized as yellow needles and was filtered from the dark solution and washed with ethanol. The disodium salt was dissolved in water, and 5 N hydrochloric acid added to pH 2–3 to precipitate the product. The 2-amino-4-hydroxy-6-carboxypyrimido-[4,5-b] pyrazine was obtained as a cream-colored amorphous powder.

Example 2

100 grams of ethyl 3,3-diethoxy-2-bromopropionate and 89.6 grams of 2,4,5-triamino-6-hydroxypyrimidine sulfite was heated at 90° for one hour in 1.5 liters of 4 N hydrochloric acid. Heating was continued for 45 minutes after adding 32 grams of iodine. After cooling the solution, the pH was adjusted to between 2 and 3 with 5 N sodium hydroxide to precipitate the crude acid, which was purified as described above in Example 1.

Example 3

12 grams of 3,3-diethoxy-2-chloropropionate and 13 grams of 2,4,5-triamino-6-hydroxypyrimidine sulfite was heated at 90° for one hour in 440 cc. of 4 N hydrochloric acid. Five grams of iodine was added and heating continued for 30 minutes. After cooling, 5 N sodium hydroxide was added to pH 2 to 3 and the crude 2-amino-4-hydroxy-6-carboxypyrimido-[4,5-b] pyrazine was filtered and purified as in Example 1.

Example 4

92 grams of the methyl ester of 3-oxo-2-chloropropionic acid and 182 grams of 2,4,5-triamino-6-hydroxypyrimidine sulfite was heated in 3.1 liters of 4 N hydrochloric acid at 90° for one hour. After adding 60 grams of iodine, the solution was heated 45 minutes longer. Adjustment of the pH to 2 to 3 with 5 N sodium hydroxide precipitated the crude acid which was purified as described in Example 1.

Example 5

26 cc. of a solution containing 4.5 grams of the sodium salt of methyl-3-oxo-2-chloropropionate and 6 grams of 2,4,5-triamino-6-hydroxypyrimidine was heated in 82 cc. of 4 N hydrochloric acid at 90° for 45 minutes. After the addition of 2.3 grams of iodine, heating was continued for 30 minutes. The solution was cooled and 5 N sodium hydroxide was added to pH 2 to 3 to precipitate the crude acid which was purified as in Example 1.

Example 6

400 mg. of 2-amino-4-hydroxy-6-carboxypyrimido [4,5-b] pyrazine was dissolved in 200 ml. of 1 N hydrochloric acid in absolute ethanol by warming on a steam bath and filtering. It became cloudy in several hours and was seeded with some crystals made previously. It crystallized out quite readily then. The mixture was then heated to boiling for a few minutes but the crystals did not dissolve. It was put in the chill room for 2 days and the crystals were filtered off and dried. The compound obtained was the hydrochloride of 2-amino-4-hydroxy-6-carbomethoxy pyrimido [4,5-b] pyrazine.

Example 7

A mixture of 0.5 g. of 2,4,5-triamino-6-hydroxypyrimidine, 0.95 g. of ethyl-3,3-diethoxy-2-bromopropionate, 0.29 g. of anhydrous sodium acetate, and 15 cc. of absolute ethanol was boiled in an atmosphere of nitrogen for six hours. The reaction mixture was then acidified with a mixture of 5 cc. of water and 2 cc. of concentrated hydrochloric acid and again refluxed for about one-half hour. After standing overnight the solution was filtered and the filtrate evaporated to dryness in vacuo. The solid residue was dissolved in about 20 cc. of hot water and treated with a solution of iodine in aqueous potassium iodide solution until the iodine color persisted. After heating on the steam bath for one hour the mixture was cooled and the precipitate was collected and washed with water containing sulfur dioxide. After further washing with water, the product was dissolved in sodium hydroxide at pH 12, treated with activated charcoal, filtered, and precipitated with hydrochloric acid at a pH between 1 and 2. The product, (2-amino-4-hydroxy-6-carboxy pyrimido [4,5-b] pyrazine), was washed and dried.

We claim:

1. A method of preparing 2-amino-4-hydroxy-6-carboxypyrimido 4,5-b pyrazine which comprises mixing 2,4,5-triamino-6-hydroxypyrimidine with a member of the group consisting of compounds having the formula:

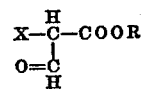

in which X is a halogen and R is an alkyl radical, and acetals thereof, in the presence of a solvent at a temperature of from about 20° C. to about 120° C. and recovering the 2-amino-4-hydroxy-6-carboxypyrimido [4,5-b] pyrazine which forms.

2. A method of preparing 2-amino-4-hydroxy-6-carboxypyrimido 4,5-b pyrazine which comprises mixing 2,4,5-triamino-6-hydroxypyrimidine with a member of the group consisting of compounds having the formula:

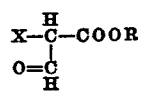

in which X is a halogen and R is an alkyl radical, and acetals thereof, at a temperature of from about 20° C. to about 120° C. for from about 1 hour to about 10 hours in the presence of a solvent and recovering the 2-amino-4-hydroxy- 6-carboxypyrimido [4,5-b] pyrazine which forms.

3. A method which comprises mixing 2,4,5-triamino-6-hydroxypyrimidine with an ester of 3-oxo-2-chloropropionic acid in a solvent and heating within the range 20° C. to about 120° C. the reaction mixture under acidic conditions to obtain 2-amino-4-hydroxy-6-carboxypyrimido 4,5-b pyrazine and recovering the 2-amino-4-hydroxy-6-carboxypyrimido [4,5-b] pyrazine which forms.

4. A method which comprises mixing 2,4,5-triamino-6-hydroxypyrimidine with ethyl-3,3-diethoxy-2-chloropropionate in a solvent and heating within the range 20° C. to about 120° C. the reaction mixture under acidic conditions to obtain 2 - amino - 4 - hydroxy - 6 - carboxypyrimido 4,5-b pyrazine and recovering the 2-amino-4-hydroxy - 6 - carboxypyrimido [4,5-b] pyrazine which forms.

JOHN H. MOWAT.
JAMES H. BOOTHE.